July 21, 1959  H. W. DAVIS  2,895,557
BEACH CLEANING ATTACHMENT
Filed March 15, 1957  2 Sheets-Sheet 1
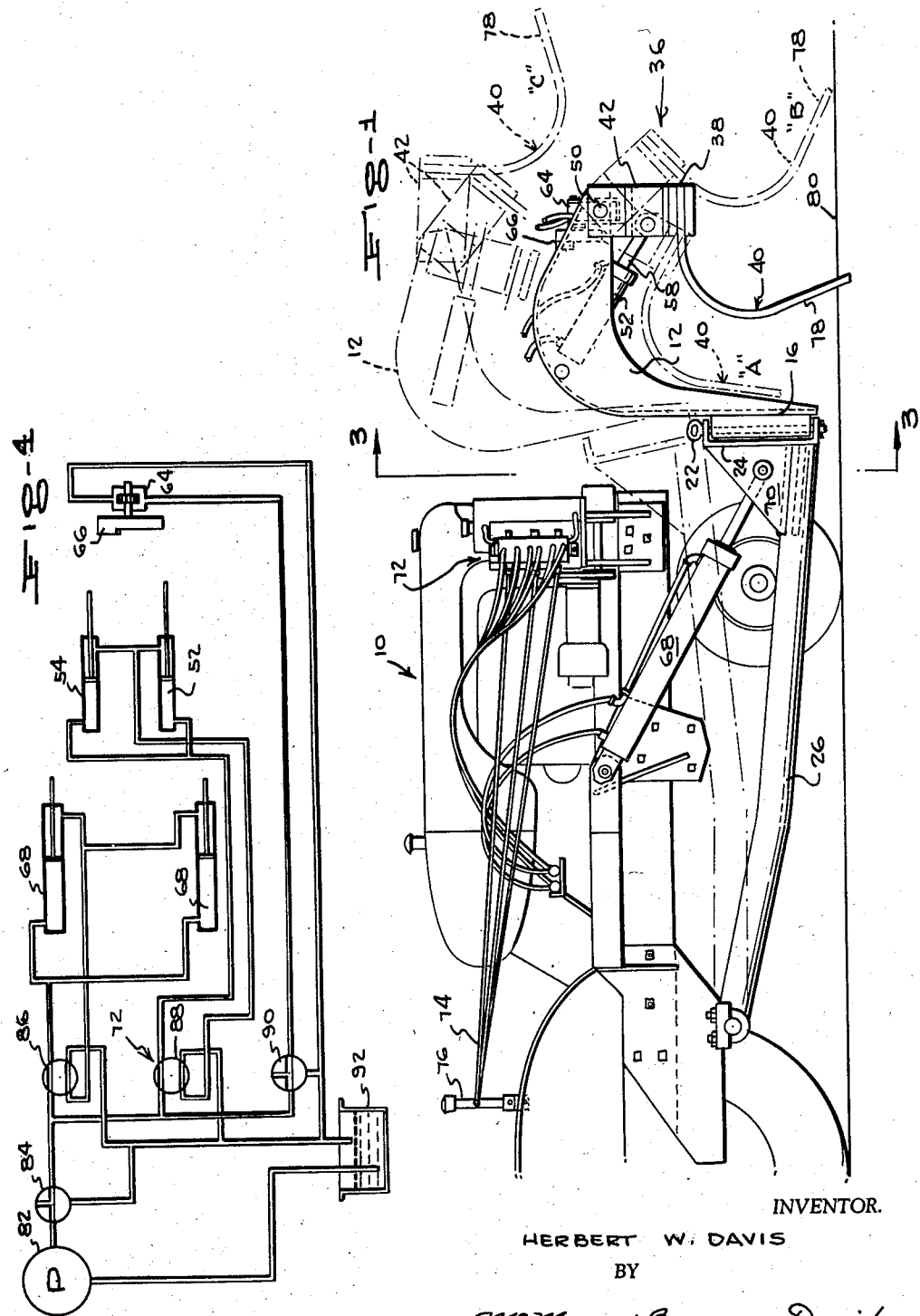
INVENTOR.
HERBERT W. DAVIS
BY
McMorrow, Berman & Davidson
ATTORNEYS July 21, 1959     H. W. DAVIS     2,895,557
BEACH CLEANING ATTACHMENT
Filed March 15, 1957     2 Sheets-Sheet 2
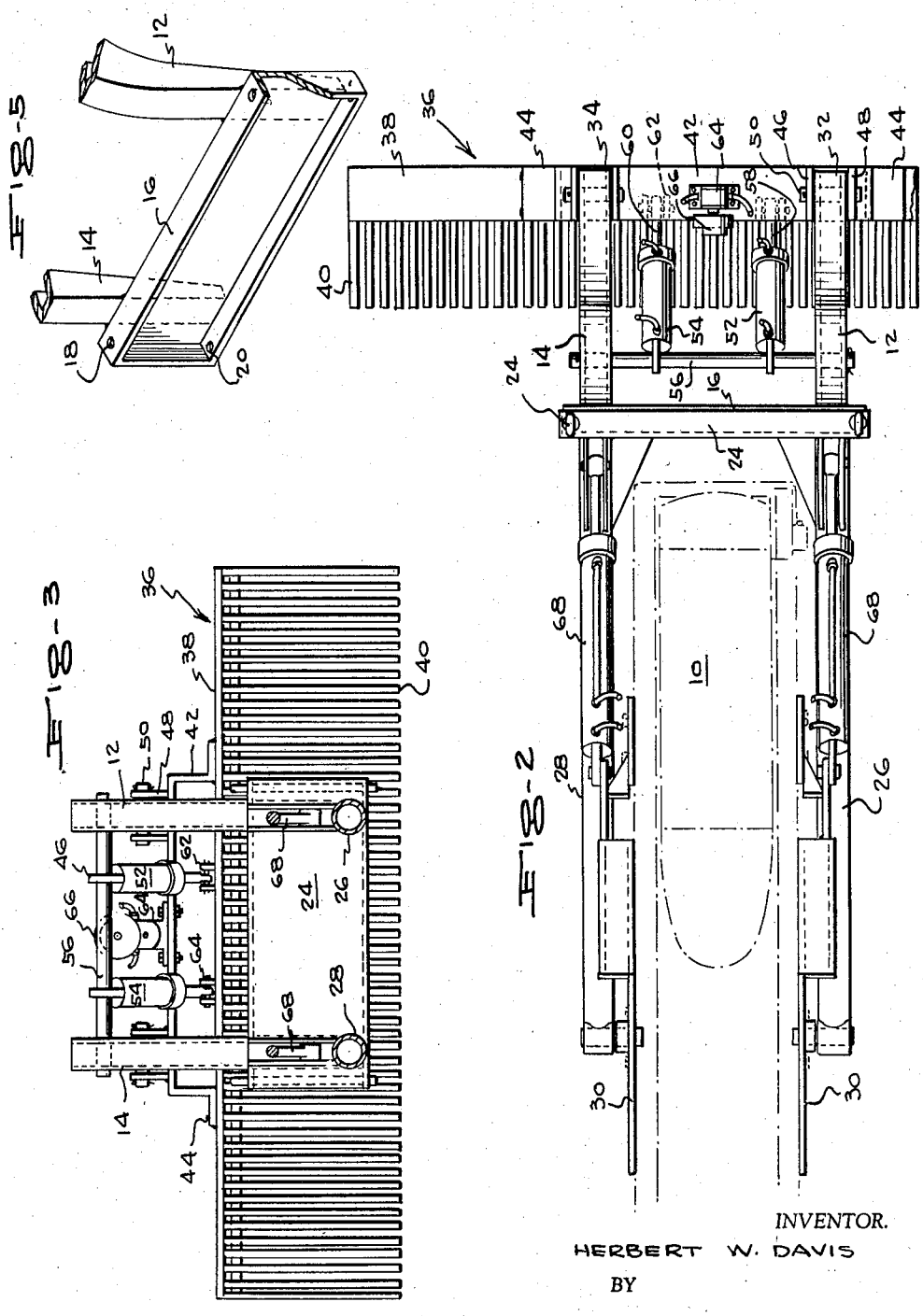
INVENTOR.
HERBERT W. DAVIS
BY
McMorrow, Berman + Davidson
ATTORNEYS

United States Patent Office 2,895,557
Patented July 21, 1959

2,895,557

BEACH CLEANING ATTACHMENT

Herbert W. Davis, Hackettstown, N.J.

Application March 15, 1957, Serial No. 646,365

4 Claims. (Cl. 171—63)

The present invention relates to an attachment for a tractor, bulldozer, or other mobile vehicle for use in cleaning a beach or other area of sand.

An object of the present invention is to provide a beach cleaning attachment for a mobile vehicle which lends itself to the efficient cleaning of the sand of a beach of debris such as papers, bottles, and other trash.

Another object of the present invention is to provide a beach cleaning attachment for a tractor or other mobile vehicle having lift arms which may be used to efficiently clean the sand, either wet or dry, of a beach of debris and to load such debris into a truck or other place of disposal.

A further object of the present invention is to provide a beach cleaning attachment for a tractor or other mobile vehicle which is sturdy in construction, one having means for shaking the rake assembly so as to dislodge between the teeth thereof the loose wet or dry sand and to retain the debris collected, one which is sturdily made and economical to manufacture and assemble, and one which is highly efficient in action.

These and other objects and advantages of the present invention will be fully apparent from the following description when taken in connection with the annexed drawings, in which:

Figure 1 is an elevational view of the forward portion of a tractor showing the beach cleaning attachment according to the present invention installed thereon, the dotted lines indicating the raised position of the attachment for depositing collected debris into a truck or other place of disposal;

Figure 2 is a plan view of the assembly shown in Figure 1 with a portion of the rake assembly broken away;

Figure 3 is a sectional view taken on the line 3—3 of Figure 1;

Figure 4 is a schematic view of the hydraulic control system used with the beach cleaning attachment according to the present invention; and Figure 5 is a fragmentary isometric view of a portion of the beach cleaning attachment according to the present invention.

Referring in greater detail the drawings in which like numerals indicate like parts throughout the several views, the beach cleaning attachment according to the present invention, is for use with such a mobile vehicle as a tractor, comprises a pair of uprights 12 and 14 rising from each end of a beam 16 and positioned adjacent the forward end of the tractor, designated generally by the reference numeral 10. The beam 16 will be seen in Figure 5 to be a box-like formation having an open side on the side thereof remote from the uprights 12 and 14 and having apertures 18 and 20 at each end in registry with each other and adapted to receive therethrough a pin 22 for securing the beam 16 within the open face of a beam 24. The beam 24 constitutes attaching means secured to the complemental ends of a pair of lift arms 26 and 28 which have their complemental other ends pivotally mounted in the side members 30 of the tractor 10 for swinging up and down movement about a horizontal axis.

Arms 32 and 34 extend forwardly of and are carried by the upper end of each of the uprights 12 and 14, respectively, and are in registry with each other. A rake assembly 36, including a support 38 having a plurality of concavely curved teeth 40 arranged in spaced relation therealong and dependingly carried by the support 38, is positioned so that the support 38 extends parallel to the beam 16 with the teeth 40 facing away from the beam 16.

Means is provided connecting the support 38 to the forward ends of the arms 32 and 34 for rocking movement of the assembly 36 about a horizontal axis. Specifically, this means comprises an inverted U-shaped member 42 having flanges 44 projecting outwardly from each of the legs of the members 42 at the free end thereof and fixed by welding or other suitable means to the upper surface of the support 38. The bight of the member 42 is elongated and is disposed horizontally with upstanding lugs 46 and 48 arranged in a pair at each end of the bight forming trunnions for a pivot pin 50 which extends through a hole provided in the free end of each of the arms 32 and 34.

Means is provided operatively connected to the support 38 for effecting the rocking movement of the support 38 and consists in a pair of hydraulic cylinder assemblies 52 and 54 arranged in parallel spaced relation and each having its upper end anchored on a cross bar 56 which extends between the uprights 12 and 14 inwardly of the point of connection of the respective one of the arms 32 and 34. The actuating arms 58 and 60 of the hydraulic cylinder assemblies 52 and 54, respectively, have their free ends mounted between upstanding trunnion members 62 which are carried by the support 38 beneath the bight of the member 42.

Vibratory force imparting means is provided operatively connected to the support 38 for applying a shaking action to the assembly teeth 40. This means consists in a hydraulic motor 64 having an off-center weight rotatably mounted upon the motor 64, the weight being indicated in Figures 1 and 2 by the reference numeral 66.

Another hydraulic cylinder assembly 68 is positioned on each side of the tractor 10 with one end pivotally connected to a side member of the tractor 10 and the actuating arm thereof is pivotally connected to a web 70 reinforcing the attachment of the beam 24 to the adjacent one of the arms 26 and 28.

A hydraulic control unit designated generally by the reference numeral 72 is carried by the tractor 10 forwardly of the engine and on one side thereof and by suitable control rods 74 and operating handles 76 control the flow of the fluid to the hydraulic cylinder assemblies 52 and 54 and to the hydraulic motor 64 and to the hydraulic cylinder assemblies 68 on the tractor 10 for raising and lowering the rake assemblies 36 and for effecting the rocking motion of the rake assembly 36 about a horizontal axis constituted by the pins 50.

Each of the teeth 40 has a straight portion 78 projecting from the end of the concavely curved portion. The associated rake assembly 36 is shiftable, due to the action of the hydraulic cylinder assemblies 52, 54, and 68, from positions in which the straight portions 78 of the teeth 40 project at an angle to the ground surface 80 to a nearly vertical position and sloping backwardly as at A, to positions in which the straight portions 78 slope sharply into the ground surface as at B, and to an elevated position as at C in which the straight portions 78 of the teeth 40 slope upwardly above the horizontal.

Referring to Figure 4, the hydraulic system used with the attachment according to the present invention consists in the hydraulic pump 82 of the tractor and a first control valve 84, a reversible control valve 86 for controlling the admission of hydraulic fluid into either end of the hydraulic cylinder assemblies 68, another reversible control valve 88 for controlling the admission of hydraulic fluid into either of the ends of the hydraulic cylinder assemblies 52 and 54, and a control valve 90 for controlling the admission of hydraulic fluid under pressure to the hydraulic motor 54. A reservoir 92 completes the hydraulic system and is connected to the pump 82 of the tractor in the conventional manner.

In use, the beach cleaning attachment according to the present invention may be attached to the forward end of a moblie vehicle such as the tractor 10 and may be used in either dry or wet sand to clean a beach or other land area of debris and trash with the teeth 40 of the rake assembly 36 positioned in any one of several positions so as to most effectively rake through the sand or ground surface 80 to gather and remove debris therefrom and to lift the same to a position of disposal into a truck or other place of disposal.

What is claimed is:

1. A beach cleaning attachment comprising a pair of uprights arranged in transverse spaced relation, a beam positioned rearwardly of and extending transversely of said uprights and secured to the latter, an arm extending forwardly of and carried by each of said uprights, said arms being in registry with each other, a rake assembly including a support having a plurality of concavely curved teeth arranged in spaced relation therealong positioned so that the support extends parallel to said beam with the teeth facing away from said beam and having the support connected to said arms for rocking movement of said assembly about a horizontal axis, and means operatively connected to said arms and said assembly support for effecting the rocking movement of said assembly support.

2. A beach cleaning attachment comprising a pair of uprights arranged in transverse spaced relation, a beam positioned rearwardly of and extending transversely of said uprights and secured to the latter, an arm extending forwardly of and carried by each of said uprights, said arms being in registry with each other, a rake assembly including a support having a plurality of concavely curved teeth arranged in spaced relation therealong positioned so that the support extends parallel to said beam with the teeth facing away from said beam and having the support connected to said arms for rocking movement of said assembly about a horizontal axis, means operatively connected to said arms and said assembly support for effecting the rocking movement of said assembly support, and vibratory force imparting means operatively connected to said support for applying a shaking action to said assembly teeth.

3. For use with a mobile vehicle having a pair of lift arms connected at the complemental ends thereto for swinging up and down movement about a horizontal axis, means operatively connected to said arms for effecting the movements of the latter, and attaching means on the other complemental ends of said arms, a beach cleaning attachment comprising a pair of uprights arranged in transverse spaced relation, a beam positioned rearwardly of and extending transversely of said uprights and secured thereto, said beam being adapted to be detachably secured to said attaching means of said lift arms, an arm extending forwardly of and carried by each of said uprights, said arms being in registry with each other, a rake assembly including a support having a plurality of concavely curved teeth arranged in spaced relation therealong positioned so that the support extends parallel to said beam with the teeth facing away from said beam and having the support connected to said arms for rocking movement of said assembly about a horizontal axis, and means operatively connected to said arms and said assembly support for effecting the rocking movement of said assembly support.

4. For use with a mobile vehicle having a pair of lift arms connected to the complemental ends thereto for swinging up and down movement about a horizontal axis, means operatively connected to said arms for effecting the movements of the latter, and attaching means on the other complemental ends of said arms, a beach cleaning attachment comprising a pair of uprights arranged in transverse spaced relation, a beam positioned rearwardly of and extending transversely of said uprights and secured thereto, said beam being adapted to be detachably secured to said attaching means of said lift arms, an arm extending forwardly of and carried by each of said uprights, said arms being in registry with each other, a rake assembly including a support having a plurality of concavely curved teeth arranged in spaced relation therealong positioned so that the support extends parallel to said beam with the teeth facing away from said beam and having the support connected to said arms for rocking movement of said assembly about a horizontal axis, means operatively connected to said arms and said assembly support for effecting the rocking movement of said assembly support, and vibratory force imparting means operatively connected to said support for applying a shaking action to said assembly teeth.

References Cited in the file of this patent

UNITED STATES PATENTS

| | | |
|---|---|---|
| 469,973 | Morrow | Mar. 1, 1892 |
| 2,295,917 | Schwan | Sept. 15, 1942 |
| 2,475,908 | McCleskey | July 12, 1949 |
| 2,491,079 | Bestland | Dec. 13, 1949 |
| 2,618,111 | Egstad | Nov. 18, 1952 |
| 2,636,328 | Jochim | Apr. 28, 1953 |

FOREIGN PATENTS

| | | |
|---|---|---|
| 124,336 | Germany | Oct. 14, 1901 |

OTHER REFERENCES

Davis Mfg. Co. publication, Form No. 807, Skyline Loader, New 90 Series, Davis Mfg. Co., Wichita, Kansas.